(12) United States Patent
Zhu

(10) Patent No.: US 10,349,264 B2
(45) Date of Patent: Jul. 9, 2019

(54) METHOD AND SYSTEM FOR CONTROLLING DATA TRANSMISSION

(71) Applicant: Alibaba Group Holding Limited, George Town, Grand Cayman (KY)

(72) Inventor: Chunhui Zhu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 15/968,362

(22) Filed: May 1, 2018

(65) Prior Publication Data

US 2018/0324578 A1 Nov. 8, 2018

(30) Foreign Application Priority Data

May 3, 2017 (CN) .......................... 2017 1 0305543

(51) Int. Cl.
*H04W 8/08* (2009.01)
(52) U.S. Cl.
CPC ..................... *H04W 8/08* (2013.01)
(58) Field of Classification Search
CPC ....................................................... H04W 8/08
See application file for complete search history.

(56) References Cited

U.S. PATENT DOCUMENTS

| | | |
|---|---|---|
| 2003/0100303 A1 | 5/2003 | Armbruster |
| 2005/0233743 A1 | 10/2005 | Karaoguz |
| 2007/0153995 A1 | 7/2007 | Fang |
| 2007/0157296 A1 | 7/2007 | Lioy |
| 2007/0256122 A1 | 11/2007 | Foo |
| 2007/0293216 A1 | 12/2007 | Jiang |
| 2009/0070694 A1 | 3/2009 | Ore |
| 2010/0183026 A1 | 7/2010 | McEwen |
| 2011/0003579 A1 | 1/2011 | Cai |
| 2011/0149874 A1 | 6/2011 | Reif |
| 2011/0235546 A1 | 9/2011 | Horn |
| 2011/0235595 A1 | 9/2011 | Mehta |
| 2011/0270969 A1 | 11/2011 | Noh |
| 2012/0314562 A1 | 12/2012 | Zhao |
| 2013/0084829 A1 | 4/2013 | De Foy |
| 2013/0142166 A1 | 6/2013 | Bogineni |
| 2013/0201909 A1 | 8/2013 | Bosch |
| 2014/0003358 A1 | 1/2014 | Elliott |
| 2014/0169286 A1 | 6/2014 | Xu |
| 2015/0140994 A1 | 5/2015 | Partheesh |
| 2016/0007265 A1 | 1/2016 | Xiu |
| 2016/0100362 A1 | 4/2016 | Palanisamy |

(Continued)

*Primary Examiner* — Wayne H Cai
(74) *Attorney, Agent, or Firm* — Shun Yao; Park, Vaughan, Fleming & Dowler LLP

(57) ABSTRACT

One embodiment described herein provides a system and method for controlling data transmission over a cellular network. During operation, an application server receives connection-status information associated with a user equipment (UE) coupled to the cellular network. The application server services an application running on the UE. The application determines whether the UE is reachable over the cellular network based on received connection-status information, and in response to the UE not being reachable via the cellular network, the application server is configured in such a way that the application server ceases to send data packets associated with the application to the UE via the cellular network.

18 Claims, 14 Drawing Sheets

(56) References Cited

U.S. PATENT DOCUMENTS

| | | |
|---|---|---|
| 2016/0174191 A1 | 6/2016 | Singh |
| 2016/0174280 A1 | 6/2016 | Singh |
| 2016/0182402 A1 | 6/2016 | Carames |
| 2016/0198514 A1 | 7/2016 | Wang |
| 2016/0212140 A1 | 7/2016 | Sauma Vargas |
| 2018/0234291 A1* | 8/2018 | Mathison ............ H04L 41/0686 |
| 2018/0262941 A1* | 9/2018 | Huang .............. H04W 28/0221 |

* cited by examiner

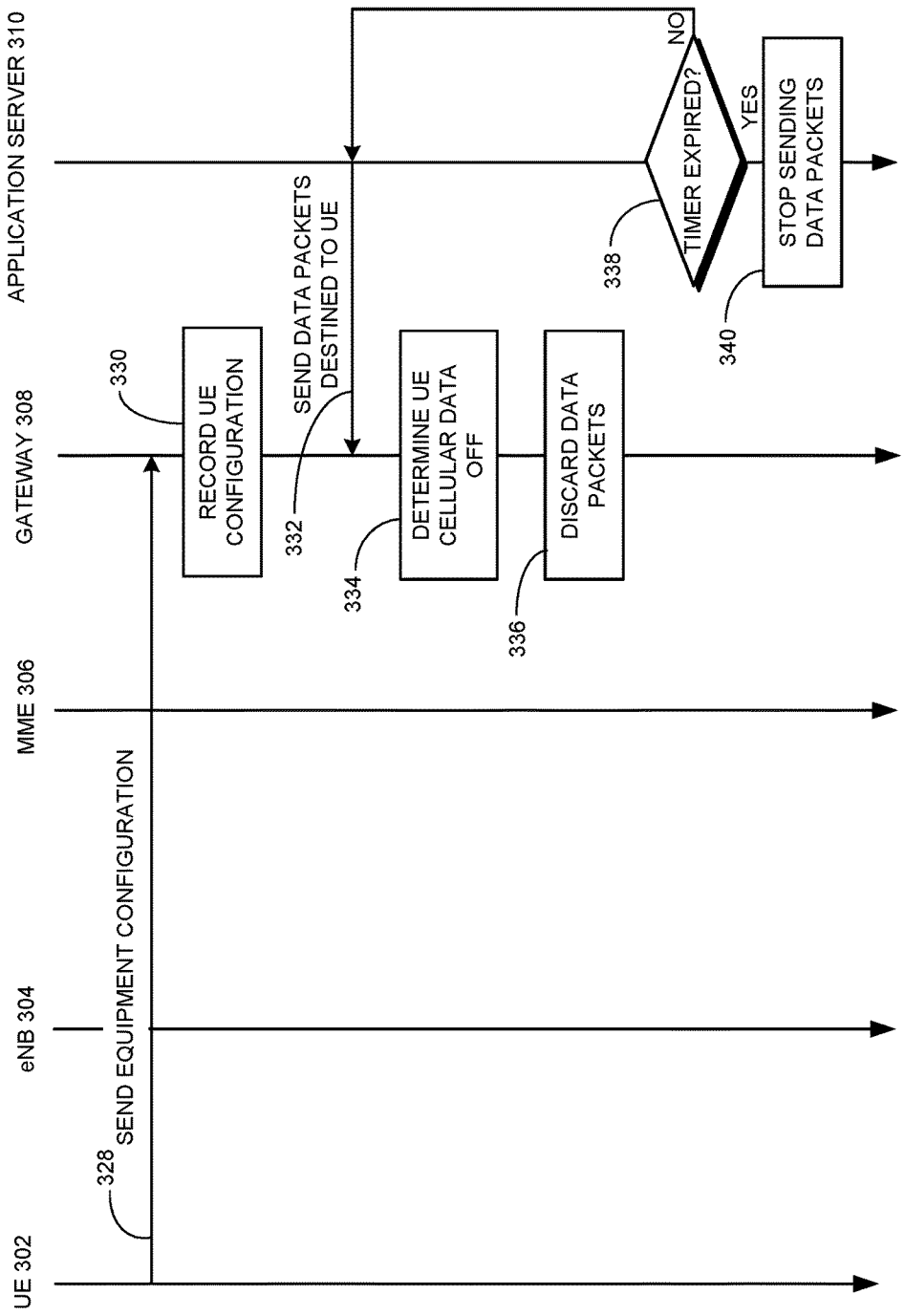
FIG. 3 (CON.)

METHOD AND SYSTEM FOR CONTROLLING DATA TRANSMISSION

RELATED APPLICATION

Under 35 U.S.C. § 119, this application claims priority to Chinese Patent Application No. 201710305543.8, filed on 3 May 2017.

BACKGROUND

Field

This disclosure is generally related to cellular networks. More specifically, this disclosure is related to a system and method for controlling data transmission in a cellular network.

Related Art

The rapid development of high-speed wireless communication technologies, such as third generation (3G) and Long-Term Evolution (LTE) technologies, has increased the capacity, speed, and coverage of cellular networks. Usually, users of mobile computing devices can make calls and access the Internet within the network provided by their providers at low cost. Moreover, data roaming allows a user to continue to receive data service on his device even when he goes outside of his mobile operator's coverage area. For example, if a customer of AT&T travels internationally (e.g., to China), he is most likely outside the network provided by AT&T. However, due to the agreement between AT&T and China Mobile (a wireless carrier operated in China), the customer can still make calls or access the Internet using China Mobile's network. Similarly, when onboard a cruise ship, a user can call or send text messages using the network provided by an at-sea provider.

Data roaming is very important to enable people to stay connected when traveling. However, some international or at-sea data roaming can result in hefty roaming fees. To avoid paying for roaming, many users choose to turn off data roaming on their devices and rely on Wi-Fi® services to stay connected while travelling. Moreover, because service providers still charge users based on the amount of data they use, many users may choose to turn off cellular data even within their home network to avoid paying excessive data fees. However, Wi-Fi services may not be available at all times, and turning off cellular data or data roaming may result in users missing certain critical notifications. Moreover, those undeliverable notifications can also waste network resources.

SUMMARY

One embodiment described herein provides a system and method for controlling data transmission over a cellular network. During operation, an application server receives connection-status information associated with a user equipment (UE) coupled to the cellular network. The application server services an application running on the UE. The application determines whether the UE is reachable over the cellular network based on received connection-status information, and in response to the UE not being reachable via the cellular network, the application server is configured in such a way that the application server ceases to send data packets associated with the application to the UE via the cellular network.

In a variation on this embodiment, the cellular network is a Long-Term Evolution network.

In a further variation, the application server receives the connection-status information from a third-party server configured to provide the Service Capability Exposure Function (SCEF).

In a variation on this embodiment, the application server subscribes to connection-status reports associated with the UE at a third-party server.

In a further variation, a respective connection-status report comprises at least identification information and the connection-status information associated with the UE.

In a further variation, the identification information can include: the UE's Internet Protocol (IP) address, or, the UE's IP address and a phone number associated with the UE.

In a further variation, the connection-status information can include one or more of: equipment configurations and cellular signal strength.

In a further variation, the equipment configurations can include one or more of: Wi-Fi setting, cellular data on-off setting, and data-roaming on-off setting.

In a further variation, the connection-status report is sent to the third-party server from a gateway of the cellular network, and the gateway is configured to receive the connection-status information from the UE.

In a variation on this embodiment, in response to the UE not being reachable via the cellular network, the application server can be configured to send data packets associated with the application to the UE via a Wi-Fi channel or a Short Message Service (SMS) channel.

One embodiment can provide a computer network, which can include a cellular network coupled to a user equipment (UE) and an application server for servicing an application running on the UE. The application server can be configured to receive connection-status information associated with UE and, in response to determining that the UE is not reachable via the cellular network based on the connection-status information, cease to send data packets associated with the application to the UE via the cellular network.

One embodiment can provide a computer network, which can include a cellular network and a user equipment (UE) coupled to the cellular network and an application server. The application server services an application running on the UE. The UE is configured to transmit connection-status information associated with UE to the application server to enable the application server to cease to send data packets associated with the application to the UE via the cellular network, in response to determining that the UE is not reachable via the cellular network based on the received connection-status information.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In this disclosure, a method and system is provided for managing application servers in a cellular network. More specifically, when a user turns off cellular data or data roaming on the user equipment (UE), the UE can send its status information to the nearby base station or local network gateway, which in turn can forward such status information to a third-party server, which can provide the Service Capability Exposure Function (SCEF). The third-party server can forward the UE's status information to an application server, notifying the application server that the UE is not connected to a cellular network, thus preventing the application server from sending downstream data packets to the UE. Because the application server is timely notified of the connection status of the UE, it no longer needs to send notifications to the disconnected UE. Compared to conventional approaches where an application server is not aware of the connection status of the UE and may send application notifications for a predetermined period before discarding the non-responded-to notifications, this new approach reduces network-resource wastage. Moreover, it allows the application server to send notifications to the UE using other communication channels, thus preventing the user from missing important notifications.

LTE Architecture

Figure 1:
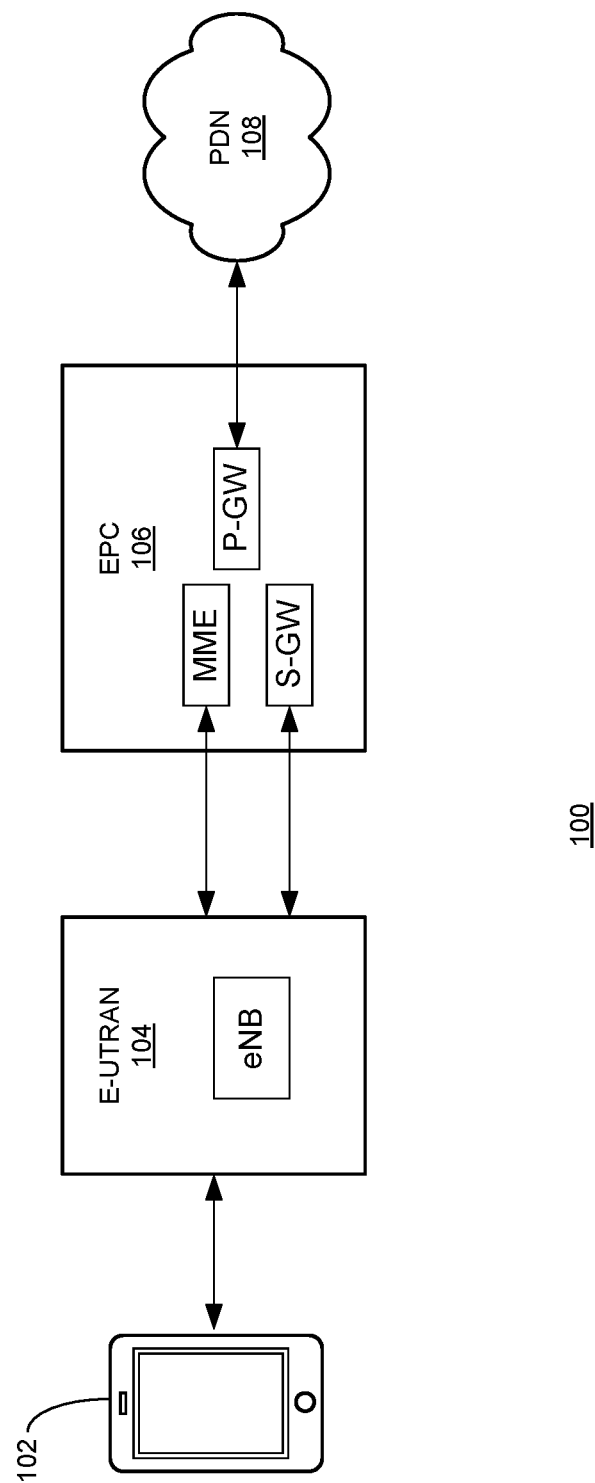
FIG. 1 illustrates the high-level network architecture of a Long-Term Evolution (LTE) network.

Long-Term Evolution (LTE) is a standard for high-speed wireless communication for mobile devices and data terminals. LTE increases the capacity and speed of cellular networks. FIG. 1 illustrates the high-level network architecture of an LTE network. LTE network 100 can include three main components: User Equipment (UE) 102, Evolved UMTS Terrestrial Radio Access Network (E-UTRAN) 104, and Evolved Packet Core (EPC) 106.

EPC 106 communicates with packet data networks (PDNs) (e.g., PDN 108) in the outside world, such as the Internet, private corporate networks or the IP multimedia subsystem.

User equipment (UE) 102 can be any device used directly by an end-user to communicate over a cellular network. A user device can include, but is not limited to: a smartphone, a laptop or tablet computer equipped with a mobile broadband adapter, or any other device capable of sending and receiving voice and data over a cellular network.

E-UTRAN 104 handles the radio communications between the UE 102 and EPC 106, and just has one component, the evolved base stations, called eNodeB or eNB. Each eNB is a base station that controls the UEs in one or more cells. There are two main functions supported by eNB. The eNB sends and receives radio transmissions to all the UEs using the analog and digital signal processing functions of the LTE air interface. In addition, the eNB controls the low-level operation of all its UEs, by sending them signaling messages such as handover commands.

EPC 106 can include a number of key components, including gateways (GWs) and Mobility Management Entities (MMEs). The gateways reside in the user plane and can be responsible for data routing in the user plane. There are two types of GWs, the Packet Data Network (PDN) Gateway (P-GW) and the Serving Gateway (S-GW). The P-GW acts as an interface between LTE network 100 and the PDNs (e.g., PDN 108). The S-GW acts as a router, and forwards data between the eNBs and the P-GW. The S-GW also serves as the local mobility anchor for inter-eNB handover and mobility among LTE networks. The MME controls the high-level operations of the UEs by means of signaling messages and a Home Subscriber Server (HSS). EPC 106 can also include the Policy Control and Charging Rules Function (PCRF) (not shown in FIG. 1), which is responsible for policy control decision-making, as well as for controlling the flow-based charging functionalities in the Policy Control Enforcement Function (PCEF), which resides in the P-GW.

Although LTE networks are used as examples, the scope of this disclosure is not limited to implementations in LTE networks.

Mobile Application Over a Cellular Network

Figure 2:
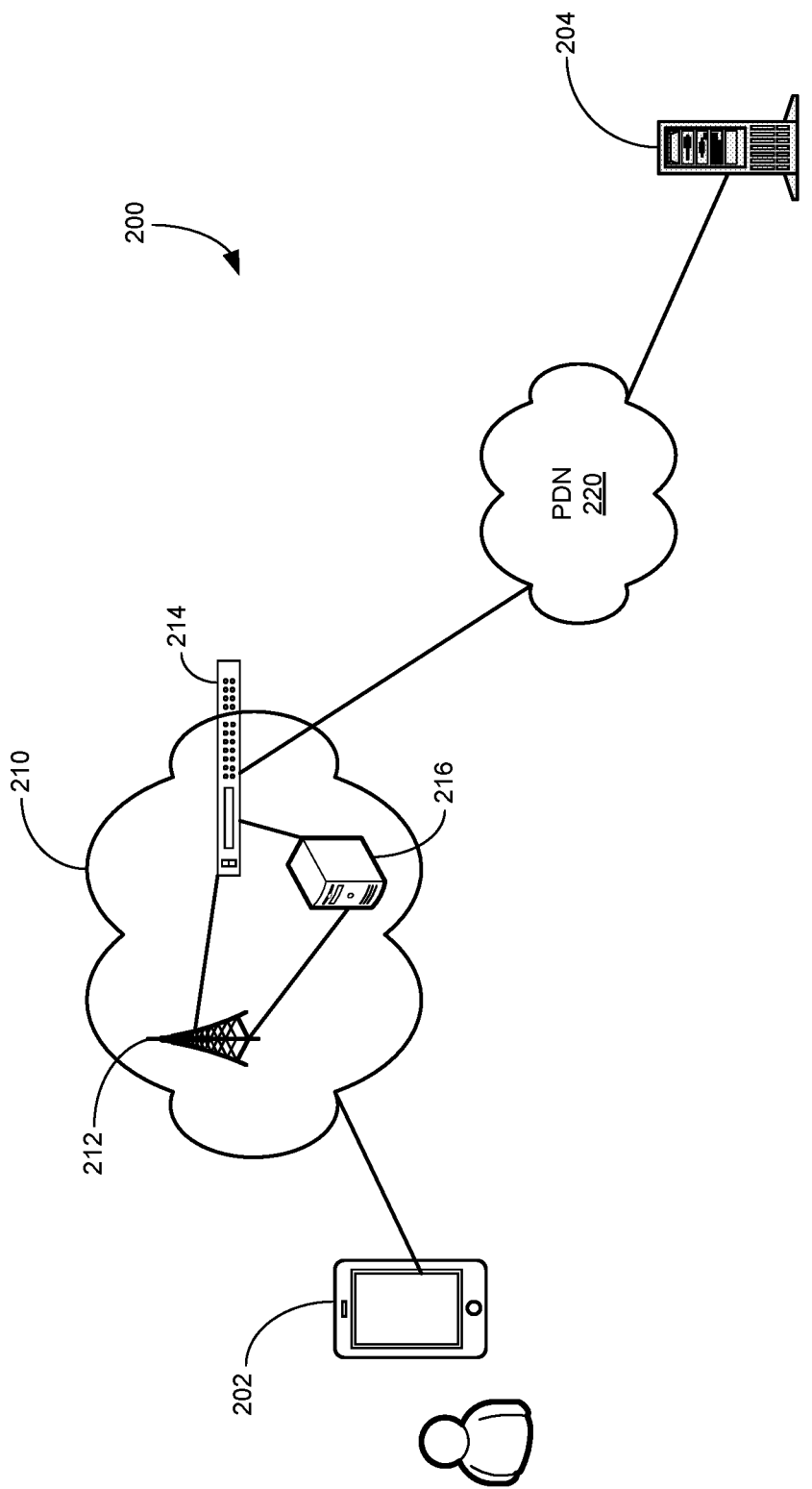
FIG. 2 illustrates a conventional network environment that facilitates mobile applications (prior art).

FIG. 2 illustrates a conventional network environment that facilitates mobile applications. Network environment 200 can include a UE 202 and application server 204, which are coupled to each other via a cellular or mobile network 210 and PDN 220. Cellular network 210 can include eNB 212, gateway 214, and MME 216. The functions performed by eNB 212, gateway 214, and MME 216 have been discussed in the previous section.

Figure 3:
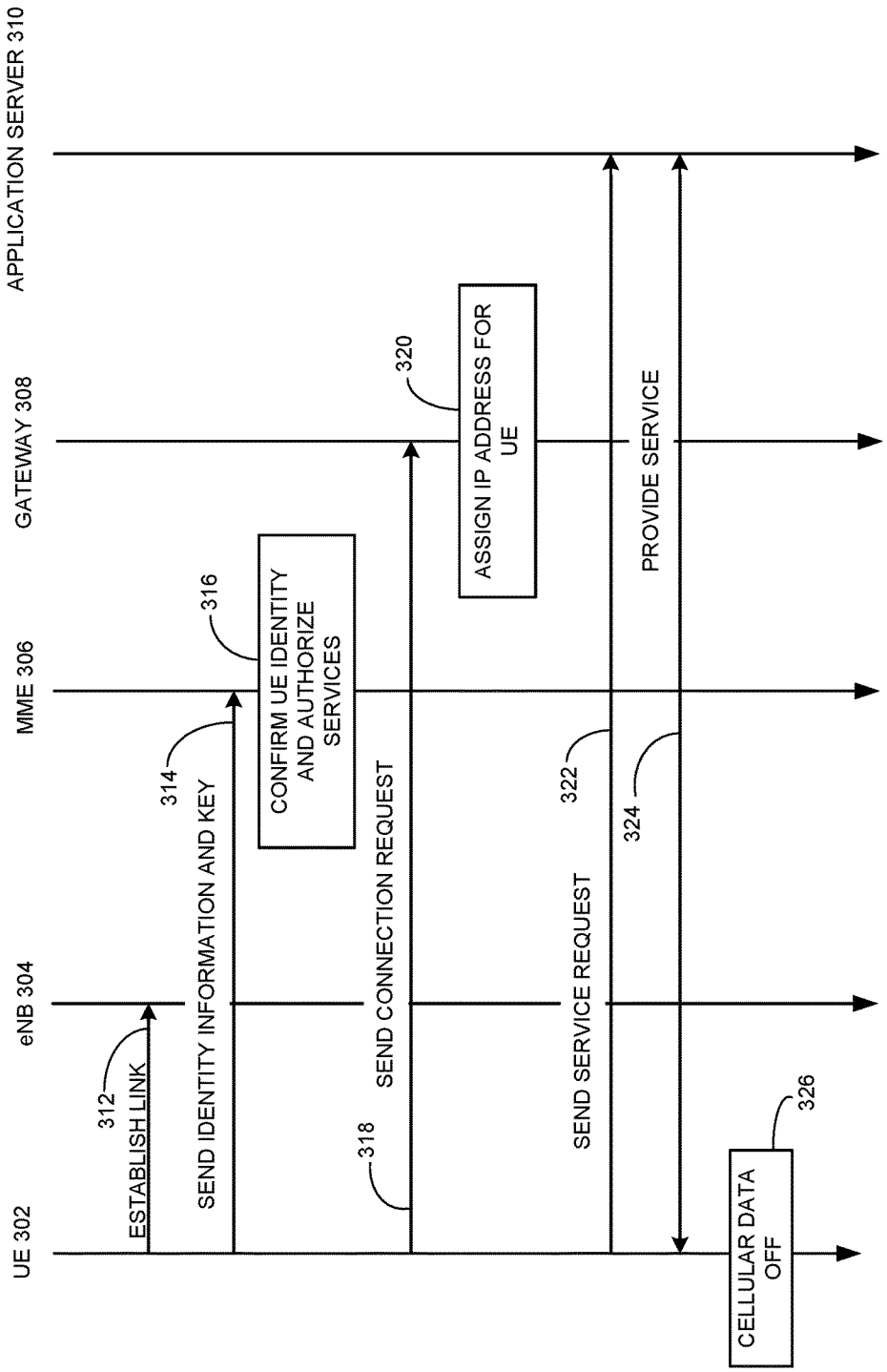
FIG. 3 presents a flowchart illustrating an exemplary operation process of a mobile application (prior art).

FIG. 3 presents a flowchart illustrating an exemplary operation process of a mobile application (prior art). The process shown in FIG. 3 can involve the various network components shown in FIG. 2. During operation, UE 302 can establish a wireless communication link with eNB 304 (operation 312). UE 302 can also send its identity information along with a corresponding key or keys to MME 306 (operation 314). MME 306 confirms the identity of UE 302 and authorizes one or more services for UE 302 based on the identity of UE 302 (operation 316).

UE 302 sends a connection request to gateway 308 (operation 318). Gateway 318 assigns an IP address to UE 302 (operation 320). Subsequently, using the assigned IP address, UE 302 sends a service request to application server 310 (operation 322). In response to the service request, application server 310 provides the requested service, which can involve sending and receiving data packets from UE 302 (operation 324).

Subsequently, the user of UE 302 turns off cellular data on UE 302 (operation 326). Note that, once cellular data is off, UE 302 ceases to send data packets to application server 310. Note that, despite having cellular data turned off, UE 302 can still communicate with gateway 308 using signaling messages. More specifically, UE 302 can communicate, using signaling messages, its current equipment configuration (e.g., cellular data off) to gateway 308 (operation 328), and gateway 308 records the configuration status of UE 302 (operation 330). As a result, gateway 308 no longer forwards data packets to UE 302. Alternatively, the user of UE 302 may turn off its data roaming; if UE 302 is outside its home network, turning off data roaming can be equivalent to turning off cellular data.

Application server 310 is unaware of the configuration status of UE 302 and may continue to send data packets associated with the service to UE 302 via gateway 308 if no other communication channel (e.g., Wi-Fi) is available (operation 332). Note that, if UE 302 is connected to a Wi-Fi network, application server 310 may send those data packets to UE 302 via the Wi-Fi network.

Upon receiving the data packets, gateway 308 checks the configuration of UE 302 and determines that UE 302 has its cellular data turned off (operation 334). As a result, gateway 308 discards the data packets (operation 336). In the meantime, application server 310 continues to send data packets until a timeout occurs (operations 338 and 340). For example, application server 310 can set a timer, and if no response to the sent data packets is received after the timer expires, application server 310 ceases to send data packets downstream.

As one can see from FIG. 3, if the user turns off cellular data on the UE (or turns off data roaming while traveling abroad), service-related data packets, which can include important application-specific notifications, sent from the application server cannot reach the UE. Consequently, the user may miss certain important notifications. For example, an online-payment application may send the user a payment reminder or a confirmation notification regarding a recent payment, and the user may not be able to see such a reminder or notification when cellular data on his device is turned off and the UE is not connected to Wi-Fi. Moreover, because the application server may make many attempts within the predetermined time period to send the data packets, which would be dropped by the cellular network gateway, transmitting these packets can waste network resources.

To solve the aforementioned problem, in some embodiments, a new component in the cellular network can be used to report the UE's configuration state (e.g., data roaming on or off) to the application server, thus allowing the application server to halt downstream transmission to the UE if the UE's cellular data is turned off and is not connected to Wi-Fi. Instead, the application server can send important notifications to the UE via other communication channels, such as Short Message Service (SMS).

Figure 4:
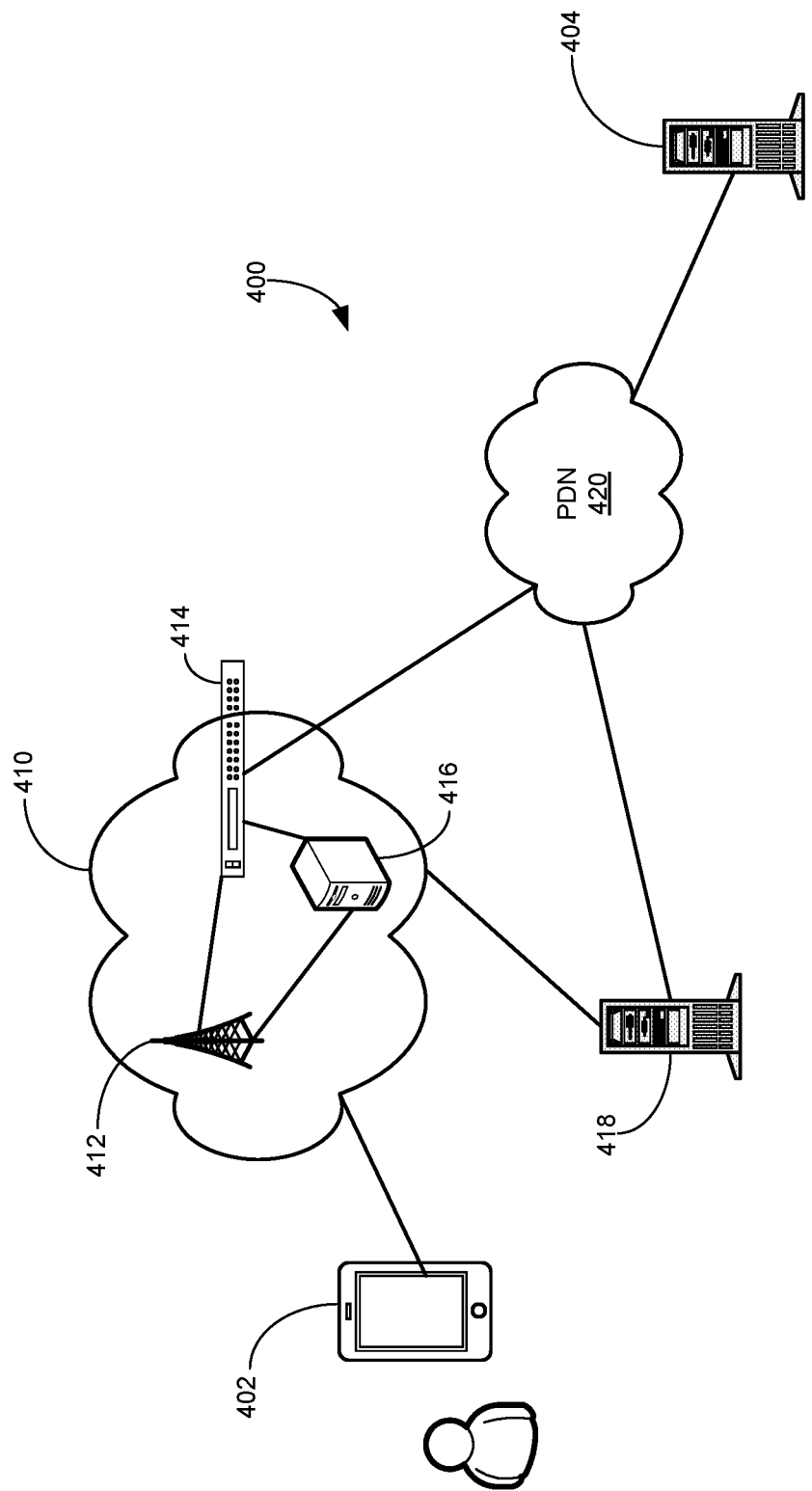
FIG. 4 illustrates a network environment that facilitates mobile applications, according to one embodiment.

FIG. 4 illustrates a network environment that facilitates mobile applications, according to one embodiment. Network environment 400 can include UE 402 and application server 404, which are coupled to each other via a cellular or mobile network 410 and PDN 420. Cellular network 410 can include eNB 412, gateway 414, MME 416, and third-party server 418. The functions performed by eNB 412, gateway 414, and MME 416 have been discussed in the previous sections.

In some embodiments, third-party server 418 can include a service-capability server that enables the Service Capability Exposure Function (SCEF). Note that the 3GPP standard defines SCEF as a key entity within the 3GPP architecture for service capability exposure that provides a means to securely expose the services and capabilities provided by 3GPP network interfaces to third-party applications, thus enabling authentication, fee-calculation, and information exchanging, hiding, and encapsulation on the network side by the third-party applications. However, the current 3GPP standard does not provide an SCEF server that can provide the equipment configuration of the UE to third-party applications. To prevent an application server from sending downstream data packets to a UE with its cellular data off, or with its data roaming off when roaming is needed, in some embodiments, the SCEF server within the cellular network can be configured to provide the UE equipment configuration information to the application server.

Figure 5:
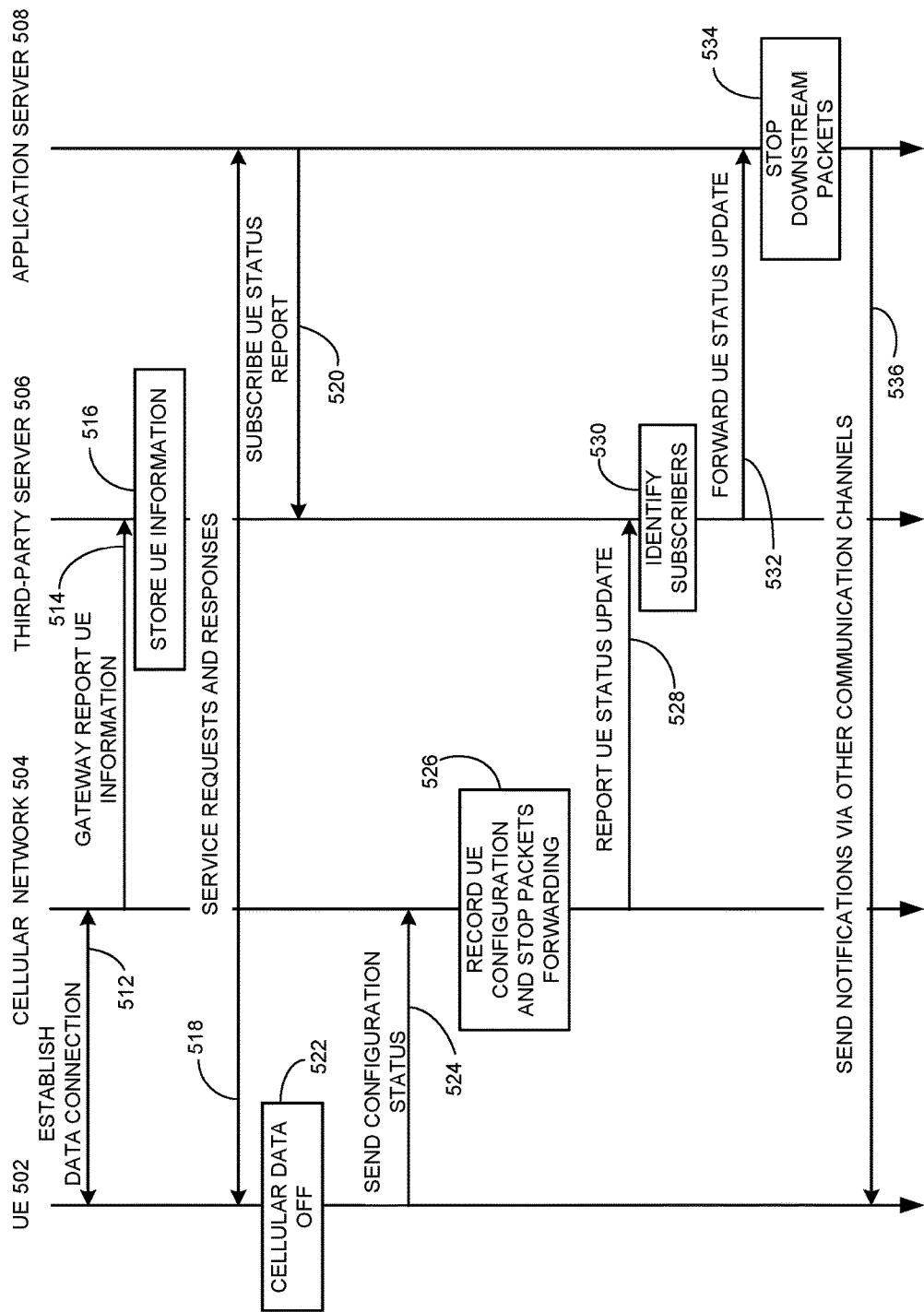
FIG. 5 illustrates an exemplary operation of a mobile application, according to one embodiment of the present invention.

FIG. 5 presents a flowchart illustrating an exemplary operation of a mobile application, according to one embodiment of the present invention. During operation, UE 502 establishes a data connection with cellular network 504 by interacting with various carrier components within cellular network 504, such as the base station (e.g., an eNB), the MME, and the gateway (operation 512). These carrier components are provided and operated by the provider of the wireless service. The interactions between UE 502 and the various carrier components within cellular network 504 can be similar to the ones shown in FIG. 3. For example, UE 502 may first connect with the base station, send its identity information and associated keys to the MME to get authorization for services, and receive an assigned IP address from the gateway.

In addition to assigning an IP address to UE 502, the gateway within cellular network 504 can report various information associated with UE 502 to a third-party server 506 (operation 514), which can also reside within cellular network 504. In some embodiments, third-party server 506 can be a service-capability server that provides the SCEF. The information reported by the gateway of cellular network 504 to third-party server 506 can include, but is not limited to: the IP address of UE 502, the phone number of UE 502, the current data-connection status of UE 502, etc. Although, in most cases, third-party server 506 can be provided and operated by an entity other than the service provider, it is also possible for the service provider to manage a server that provides the SCEF.

In the example shown in FIG. 5, the gateway may report, to third-party server 506, the data-connection status of UE 502 as being connected to cellular network 504. Note that, if UE 502 is outside the home network provided by its service provider, UE 502 can only connect to guest cellular network 504 by turning on its data roaming, with this device configuration being reported to the gateway. Third-party server 506 stores information regarding UE 502, including its IP address, phone number, and data-connection status (operation 516). Note that the data-connection status of a UE can indicate whether the UE is connected to a guest network and whether the UE's data roaming is turned on.

Subsequently, UE 502 can send service requests and receive server responses from application server 508 (operation 518). Application server 506 can be any type of server that is capable of providing an application to UE 502, including but not limited to: a message server, a mail server, a video- or audio-streaming server, a game server, a social network server, etc.

While providing the requested service to UE 502, application server 508 can subscribe, via third-party server 506, to status report of UE 502 (operation 520). More specifically, application server 508 can perform a lookup to obtain interface information of the third-party server (e.g., a service-capability server) based on the IP address and/or phone number of UE 502, and then send a subscription request to the third-party server. Note that application server 508 can obtain the IP address of UE 502 from the service request sent by UE 502. The service request may optionally contain the phone number of UE 502. Alternatively, application server 508 may look up its user-information record to find out the phone number of UE 502. The subscription request can include the IP address of UE 502 and can optionally include the phone number of UE 502. Subscribing to the status report ensures that third-party server 506 sends timely updates regarding the status, especially the connection status, of UE 502 to application server 508.

Figure 6:
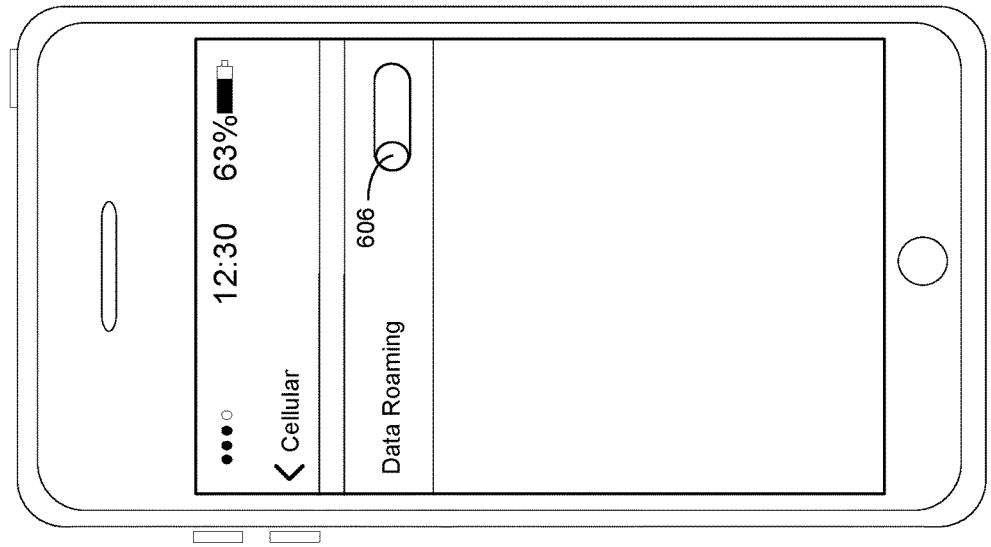
FIG. 6 illustrates an exemplary user interface for configuring a mobile device.
Figure 6:
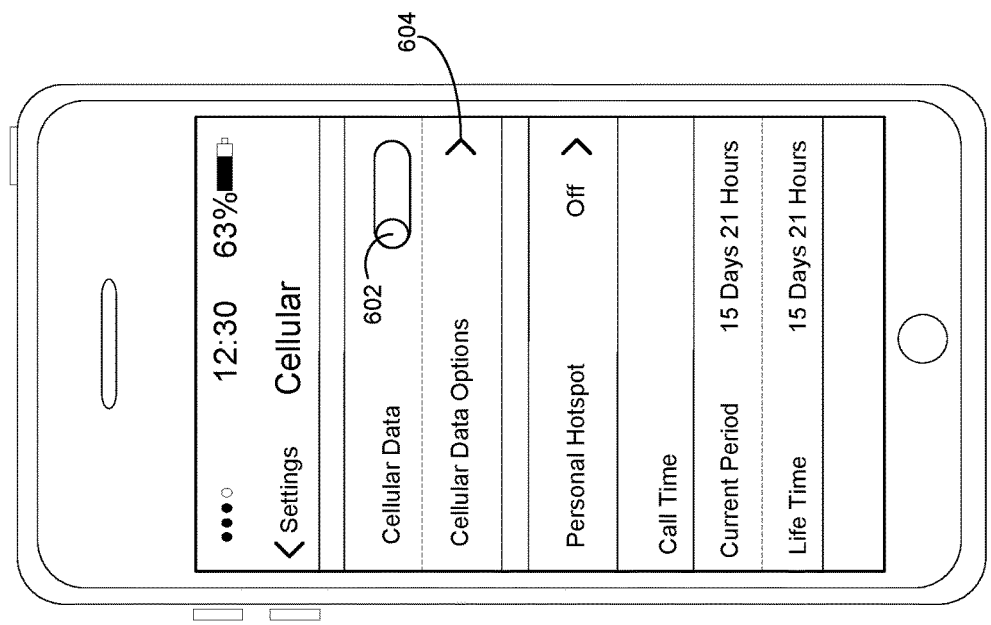

The user of UE 502 can turn off cellular data (operation 522). Such an operation is often performed manually by the user. For example, the user can access the device-setting page (similar to the one shown in the left-hand drawing of FIG. 6) to turn off cellular data. More specifically, in the example shown in FIG. 6, the user can slide control 602 to the left to turn off cellular data. Sometimes, the user of UE 502 may choose to turn off data roaming when he travels outside the coverage area of his home network. To do so, the user can select control 604 to enter the data-roaming-setting page, which can be similar to the one shown in the right-hand drawing of FIG. 6. On the data-roaming-setting page, the user can slide control 606 to the left to turn off data roaming of the device. Upon changing its status, UE 502 sends its current data-connection configuration (e.g., cellular data or data roaming off) to the gateway of cellular network 504 (operation 524). The gateway of cellular network 504 records the data-connection configuration of UE 502 and stops forwarding data packets to and from UE 502 if it determines that UE 502 has turned off cellular data (operation 526). In addition, the gateway of cellular network 504 can report the update to the UE's data-roaming configuration to third-party server 506 (operation 528). In some embodiments, the gateway of cellular network 504 can send a UE-status report to third-party server 506, and the UE-status report can include the IP address and, optionally, the phone number of UE 502. For example, the UE-status report can include the connection status of the UE (e.g., whether the UE is connected to a home or guest network, whether cellular data or data roaming is turned on, whether the UE is connected to a Wi-Fi network, etc.), the UE's IP address and, optionally, the UE's phone number.

Upon receiving the UE-status report, third-party server 506 can identify subscribers of the UE-status report based on the IP address and/or phone number included in the UE-status report (operation 530). Third-party server 506 can then forward the UE-status report to the identified subscribers (operation 532). Note that a UE may often have multiple applications running and multiple application servers may subscribe to the status report of the UE from third-party server 506. In the scenario shown in FIG. 5, the UE-status report is sent to application server 508, notifying application server 508 that data roaming of UE 502 is turned off.

Subsequent to receiving the updated UE status, which indicates that UE 502 is connected to a guest network and has its data roaming turned off, application server 508 stops sending downstream data packets to UE 502 (operation 534). Instead, application server 508 can send application-related notifications (e.g., a payment notification by a payment server or a new-mail notification by a mail server) via other types of communication channels, such as SMS or Wi-Fi, to the user of UE 502 (operation 536). For example, a payment server may need to send payment notifications to a user. If the payment server is notified that the cellular data option of UE 502 is turned off or that UE 502 is currently connected to a guest cellular network with its data roaming option tuned off, the payment server can then send the payment notifications to the user via SMS messages. On the other hand, if UE 502 is connected to a Wi-Fi network, the payment server may send payment notifications to UE 502 via the Wi-Fi connection. In other words, the payment server can send downstream data packets to the corresponding Wi-Fi access point.

Figure 7:
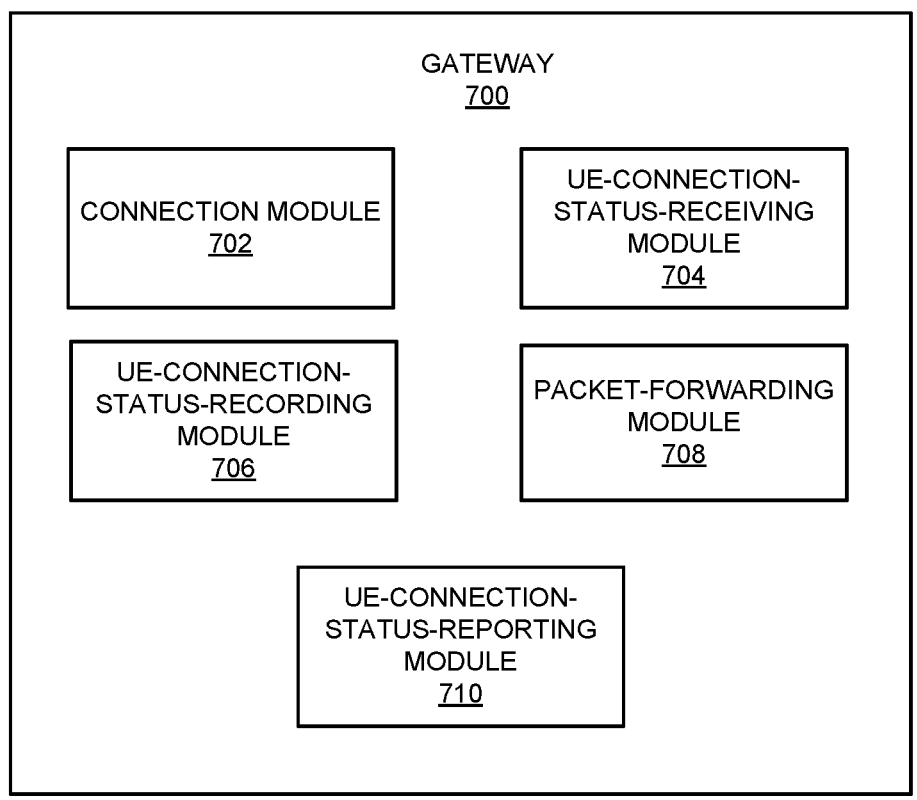
FIG. 7 illustrates an exemplary cellular network gateway module, according to one embodiment.

To enable UE-connection-status reporting to a third-party server, the gateway of the cellular network needs to include a UE-connection-status-reporting module. FIG. 7 illustrates an exemplary cellular network gateway module, according to one embodiment. Gateway module 700 can include connection module 702, UE-connection-status-receiving module 704, UE-connection-status-recording module 706, packet-forwarding module 708, and UE-connection-status reporting module 710.

Connection module 702 can be responsible for establishing data connections between the UE and gateway module 700. UE-connection-status-receiving module 704 receives, from the connected UEs, information regarding their connection status. More specifically, the connection status of a UE can include cellular-connection status (e.g., whether the UE enables cellular data, whether the UE is connected to a home or guest cellular network, whether the UE enables data roaming, whether the UE is connected to a Wi-Fi network, etc.). Each time its connection status changes (e.g., by turning off its cellular data), the UE will update its connection status by sending the new connection-status information to UE-connection-status-receiving module 704. UE-connection-status-recording module 706 records the receiving information regarding the connection status of the UEs.

Packet-forwarding module 708 can be responsible for forwarding data packets to and from the UEs. Before forwarding a data packet from the PDN to a UE, packet-forwarding module 708 may check UE-connection-status-recording module 706 to determine the connection status of the UE. If the cellular data option of the UE is turned off or if the UE is outside its home network with data roaming off, packet-forwarding module 708 will discard any packet destined to the UE. Note that a UE typically does not send data packets to gateway module 700 if the UE's cellular data is turned off.

UE-connection-status reporting module 710 can be responsible for sending the UE-connection-status report to a third-party server, such as an SCEF server. The UE-connection-status report includes the UE's identity information (e.g., the IP address and, optionally, phone number of the UE) and its current connection status.

Figure 8:
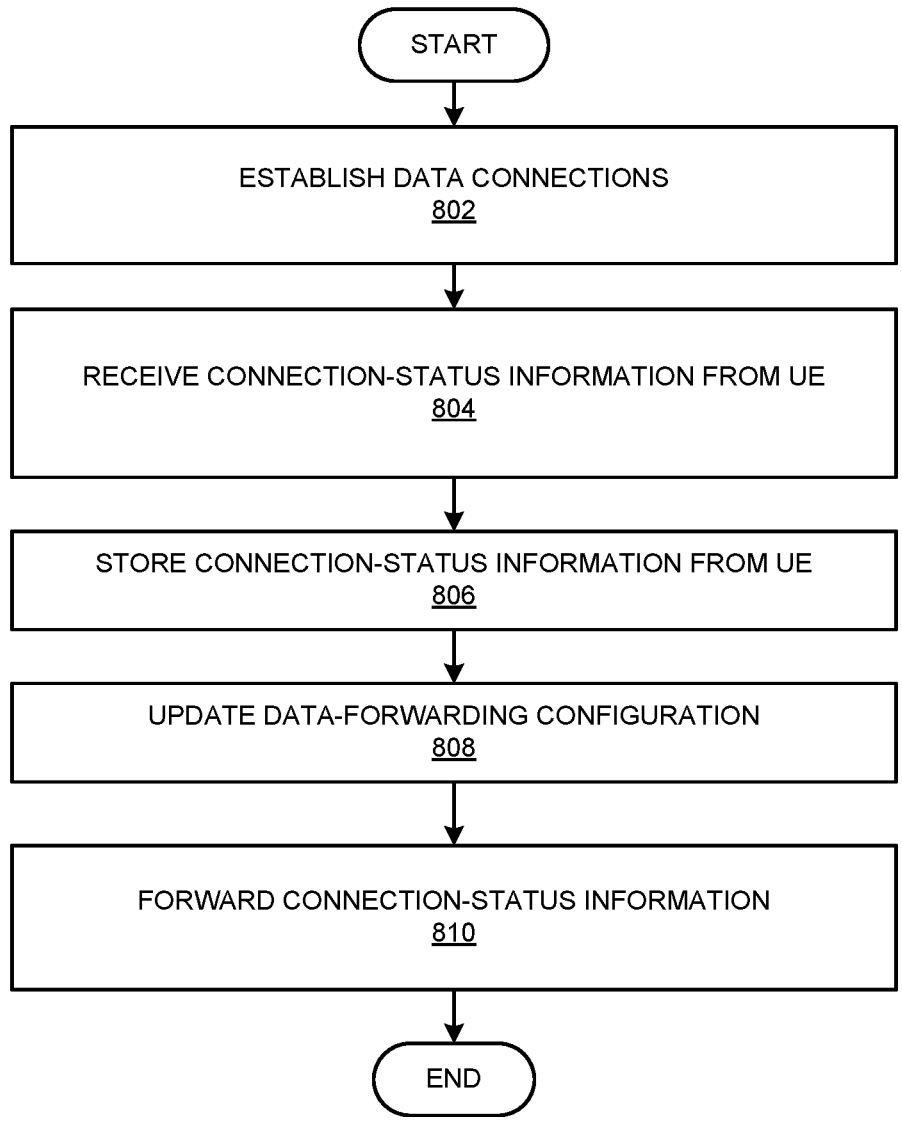
FIG. 8 presents a flowchart illustrating an exemplary process performed by the gateway of a cellular network, according to one embodiment.

FIG. 8 presents a flowchart illustrating an exemplary process performed by the gateway of a cellular network, according to one embodiment. During operation, the gateway establishes data connections with a UE (operation 802). Establishing the data connections can include the standard authentication processes. Subsequently, the gateway can receive connection-status information from a UE regarding the connection status of the corresponding UE (operation 804). The connection-status information of a UE can include its equipment configuration, such as connecting options that include: cellular data, data roaming, Wi-Fi, etc. The connection-status information can further include the connection status. For example, although a UE's Wi-Fi is turned on, the UE may not be able to connect to a Wi-Fi network. Similarly, although the UE's cellular data is turned on, the UE may not be able to connect to a cellular network due to weak signal strength; turning on data roaming does not guarantee connection. In some embodiments, the UE can be configured to send its connection-status each time its equipment configuration changes. Alternatively, a UE can be configured to send its connection-status periodically.

Upon receiving the connection-status information, the gateway stores the connection-status information (operation 806). In some embodiments, the stored connection-status information of UEs can be indexed using their identifications, such as IP addresses or phone numbers. The gateway can update its data-forwarding configuration based on the connection-status information (operation 808). For example, the gateway may stop sending and receiving data packets to and from a UE if the UE's connection-status information indicates that the UE's cellular data is turned off. The gateway also forwards the connection-status information of the UE along with the UE's identification to a third-party server (operation 810).

Figure 9:
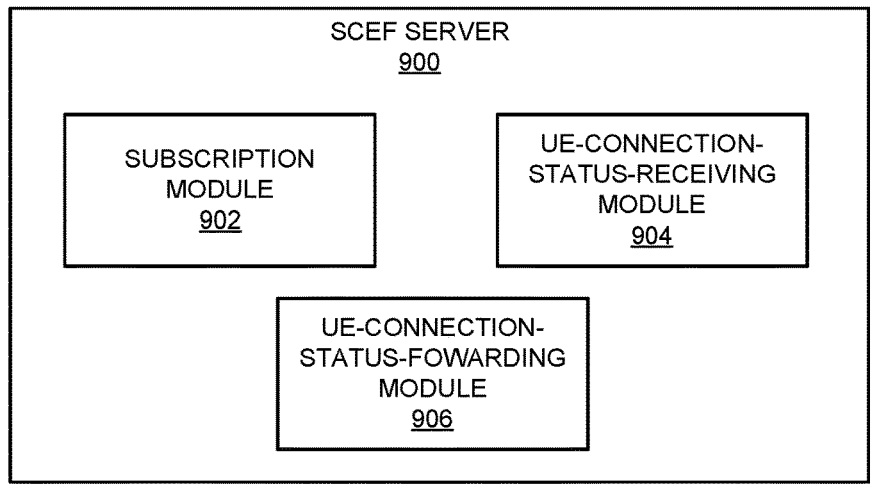
FIG. 9 illustrates an exemplary SCEF server, according to one embodiment.

In some embodiments, the third-party server provides the SCEF. More specifically, the third-party server allows the application servers to receive the most up-to-date information regarding the connection status of the UE, thus preventing the application servers from sending downstream data packets to unreachable UEs. A number of modules within the third-party server work together to achieve such functionality. FIG. 9 illustrates an exemplary SCEF server, according to one embodiment. SCEF server 900 can include a subscription module 902, a UE-connection-status-receiving module 904, and a UE-connection-status-forwarding module 906.

Subscription module 902 can be responsible for managing subscriptions from application servers to UE-connection-status reports. More specifically, subscription module 902 can receive subscription requests from application servers, with each subscription request specifying the UE's identity, such as its IP address and/or phone number, as well as the requesting application server's address. Subscription module 902 can also store the subscriptions.

UE-connection-status-receiving module 904 receives UE-connection-status reports from the gateway of the cellular network. Each time a UE establishes a connection with the gateway, the UE will send its information regarding its connection status to the gateway, which in turn forwards this information to UE-connection-status-receiving module 904 of SCEF server 900. Similarly, each time the UE's connection status changes (e.g., turning on or off cellular data, joining or leaving a Wi-Fi network, or turning on or off data roaming), the UE may send a connection-status update to the gateway, and the gateway will then forward the connection-status update to UE-connection-status-receiving module 904 of SCEF server 900.

UE-connection-status-forwarding module 906 can be responsible for forwarding the UE-connection-status information to application servers that subscribe to such information. In some embodiments, each time UE-connection-status-receiving module 904 receives a connection-status report, which can be for a newly connected UE or a status update for a previously connected UE, subscription module 902 checks to see if there are any application servers subscribed to the UE's connection-status report based on UE identity information (e.g., IP address or phone number) included in the connection-status report. If there one or more application servers subscribed to the connection-status report, UE-connection-status-forwarding module 906 forwards the connection-status report to the subscribed application servers. This allows the application servers to have up-to-date information regarding the connection status of the UE, thus preventing the application servers from sending downstream data packets (e.g., application-related notifications) to a UE that has its cellular data turned off.

Figure 10:
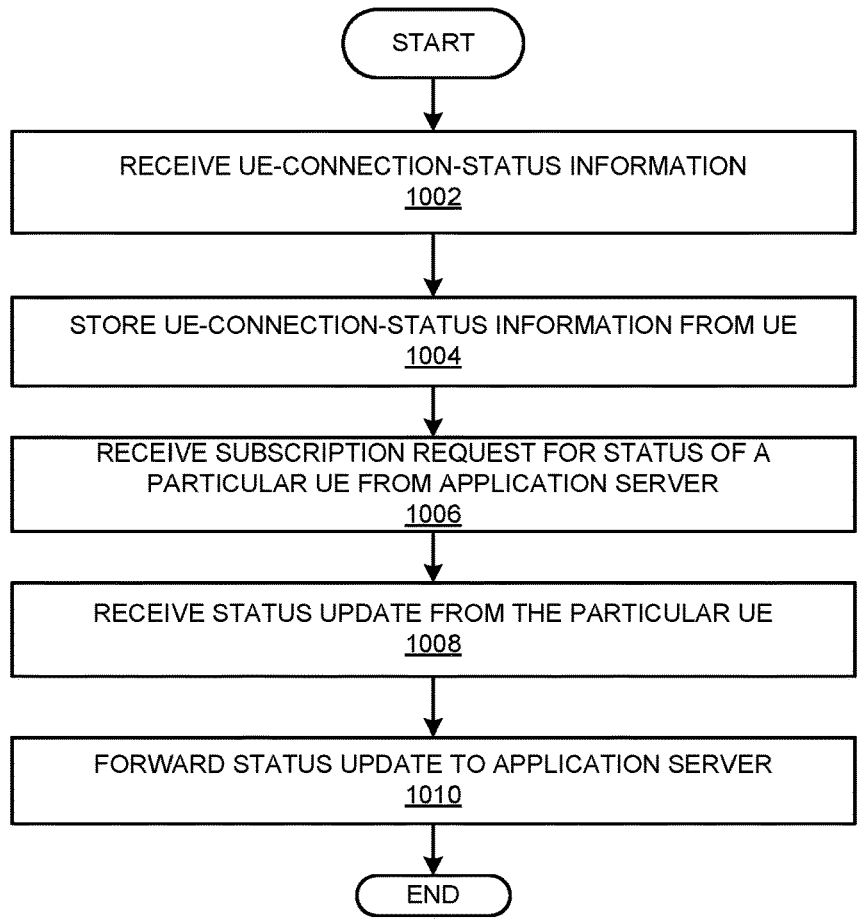
FIG. 10 presents a flowchart illustrating an exemplary process performed by the third-party server, according to one embodiment.

FIG. 10 presents a flowchart illustrating an exemplary process performed by the third-party server, according to one embodiment. During operation, the third-party server receives UE-connection-status information from the gateway of a cellular network (operation 1002) and stores the UE-connection-status information (operation 1004). More specifically, the received UE-connection-status information can include at least the UE's identification and its equipment configuration (e.g., data-connection configuration). The stored UE-connection-status information can be indexed using the UEs' identifications, such as IP addresses and/or phone numbers.

The third-party server may receive a request for a subscription, from an application server, to status information of a particular UE (operation 1006). Subsequently, the third-party server can receive a status update from that particular UE (operation 1008) and can then forward the status update of the particular UE to the application server (operation 1010).

Figure 11:
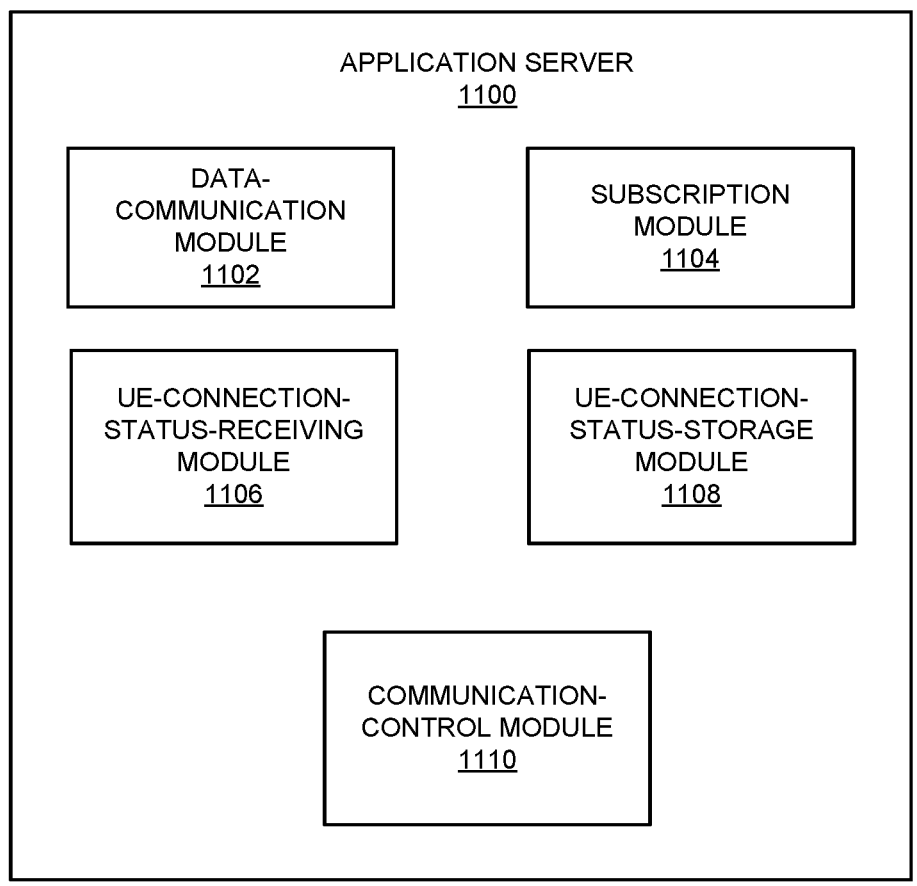
FIG. 11 illustrates an exemplary application server, according to one embodiment.

FIG. 11 illustrates an exemplary application server, according to one embodiment. Application server 1100 can include data-communication module 1102, subscription module 1104, UE-connection-status-receiving module 1106, UE-connection-status-storage module 1108, and communication-control module 1110. Data-communication module 1102 can be responsible for communicating with UEs, including sending and receiving data packets to and from the UEs. In other words, data-communication module 1102 facilitates corresponding applications running on the UEs. Subscription module 1104 can be responsible for subscribing to UE-connection-status reports from a third-party server that provides the SCEF. More specifically, subscription module 1104 can obtain a list of connected UEs from data-communication module 1102, each UE being identified by its IP address and, optionally, its phone number. Subscription module 1104 can then send a subscription request for each UE to the third-party server. The subscription request specifies the UE by its IP address and, optionally, its phone number.

UE-connection-status-receiving module 1106 can be responsible for receiving UE-connection-status reports from the third-party server. Each connection-status report can specify a UE by its IP address and, optionally, its phone number, and can indicate the current connection-status (e.g., cellular data on or off, Wi-Fi connected or not, data roaming on or off, etc.) of the specified UE. Note that each time a UE's connection status changes (e.g., a user turning on or off cellular data at the UE), UE-connection-status-receiving module 1106 receives a new connection-status report, which replaces a previous connection-status report stored in UE-connection-status-storage module 1108. In some embodiments, UE-connection-status reports stored in UE-connection-status-storage module 1108 can be indexed using the UEs' identities (e.g., their IP addresses and/or phone numbers).

Communication-control module 1110 can be responsible for controlling data-communication module 1102. More specifically, communication-control module 1110 can control downstream transmissions of data-communication module 1102. If the current connection-status report for a particular UE stored in communication-control module 1110 indicates that a UE is not reachable via a cellular network because the UE's cellular data is turned off (or the UE's data roaming is turned off where data roaming is required), communication-control module 1110 can control data-communication module 1102 in such a way that data-communication module 1102 stops downstream transmission to the particular UE via the cellular network. Moreover, in cases where communication-control module 1110 determines that the particular UE is Wi-Fi connected, communication-control module 1110 can control data-communication module 1102 to send downstream data packets to the UE via a Wi-Fi network. On the other hand, in cases where communication-control module 1110 determines that the particular UE is neither connected to a cellular network nor to a Wi-Fi network, communication-control module 1110 can control data-communication module 1102 to send certain important application-related notifications via other types of communication channels (e.g., SMS).

In some embodiments, such a control action can be triggered by UE-connection-status-receiving module 1106 receiving a UE-connection-status report. In some embodiments, in response to UE-connection-status-receiving module 1106 receiving a UE-connection-status report, communication-control module 1110 examines the received connection-status report to determine whether the connection status of the corresponding UE changes. If the connection status of the corresponding UE changes from reachable to unreachable (e.g., if the UE's cellular data option changes from "on" to "off") by a cellular network, communication-control module 1110 controls data-communication module 1102 such that data-communication module 1102 stops sending any downstream data packets to the corresponding UE via the cellular network. On the other hand, if the connection status of the corresponding UE changes from unreachable to reachable (e.g., if the UE's cellular data option changes from "off" to "on") by the cellular network, communication-control module 1110 controls data-communication module 1102 such that data-communication module 1102 resumes sending downstream data packets to the corresponding UE via the cellular network.

Figure 12:
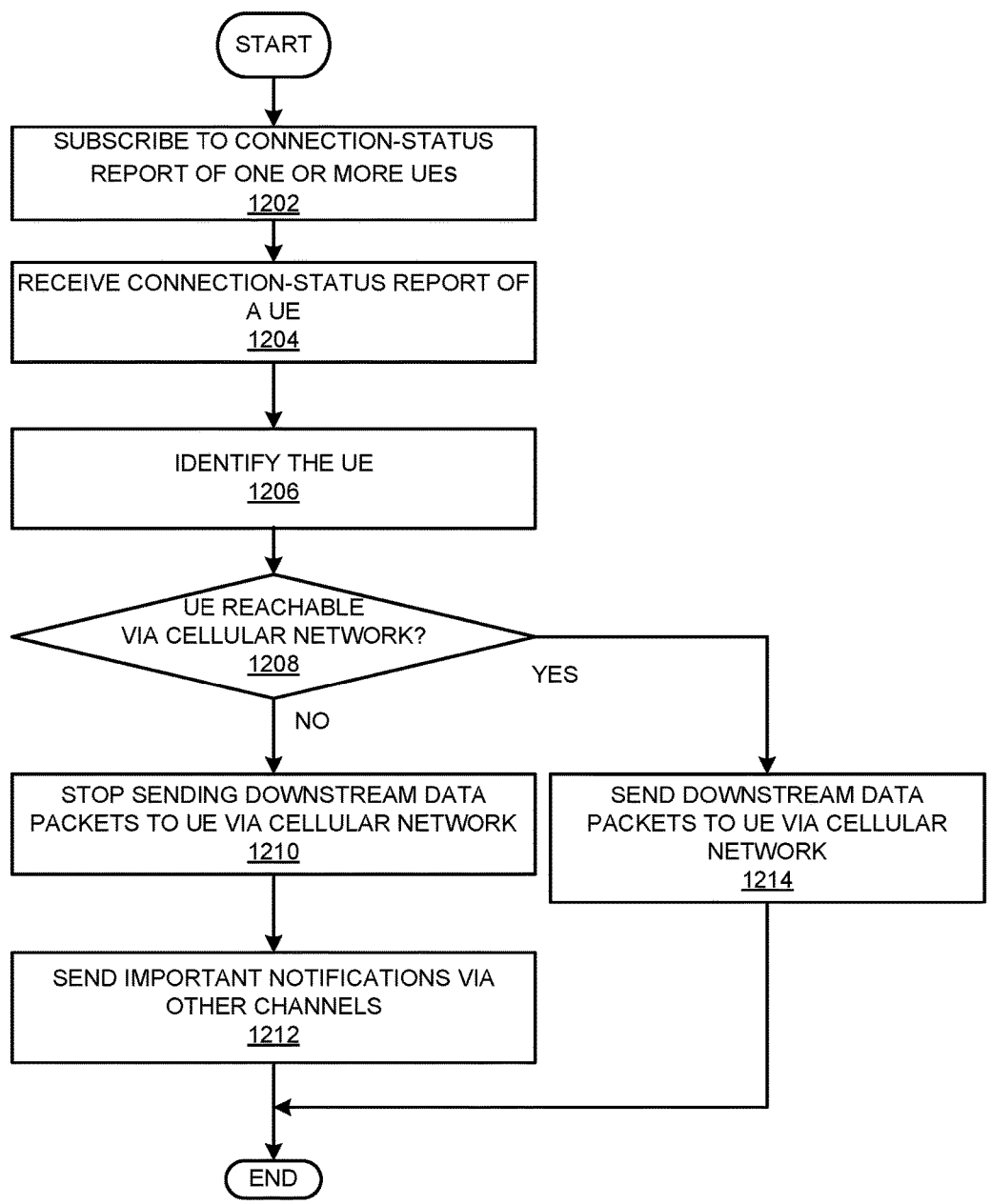
FIG. 12 presents a flowchart illustrating an exemplary communication-control process performed by an application server, according to one embodiment.

FIG. 12 presents a flowchart illustrating an exemplary communication-control process performed by an application server, according to one embodiment. During operation, the application server can subscribe to connection-status reports of one or more UEs (operation 1202). More specifically, the application server can send such subscriptions to a server that provides SCEF. The application server can receive a connection-status report of a particular UE from the SCEF server (operation 1204). The connection-status report can include the UE's identification (e.g., IP address and/or phone number), as well the UE's connection status. In some embodiments, the connection status can include the UE's configuration setting, such as the cellular data setting, the Wi-Fi setting, the data roaming setting, etc. The connection status can further include the cellular signal strength at the UE.

The application server can identify the UE based on the UE's identification included in the connection-status report (operation 1206) and determines whether the UE is reachable via the cellular network (operation 1208). For example, the connection-status report may indicate that the cellular data setting on the UE is off, making the UE unreachable, or the connection-status report may indicate that the UE's data roaming option is off while data roaming is required.

If the UE is not reachable via the cellular network, the application server can stop sending downstream data packets to the UE via the cellular network (operation 1210) and send important notifications to the UE via other communication channels (operation 1212). For example, if the application server determines that the UE is reachable via Wi-Fi, the application server can send downstream data packets, including important notifications to the UE via Wi-Fi. If Wi-Fi is not available, the application server can send important packets to the UE using other channels, such as SMS. If the UE is reachable via the cellular network, the application server can send downstream data packets to the UE via the cellular network (operation 1214).

Figure 13:
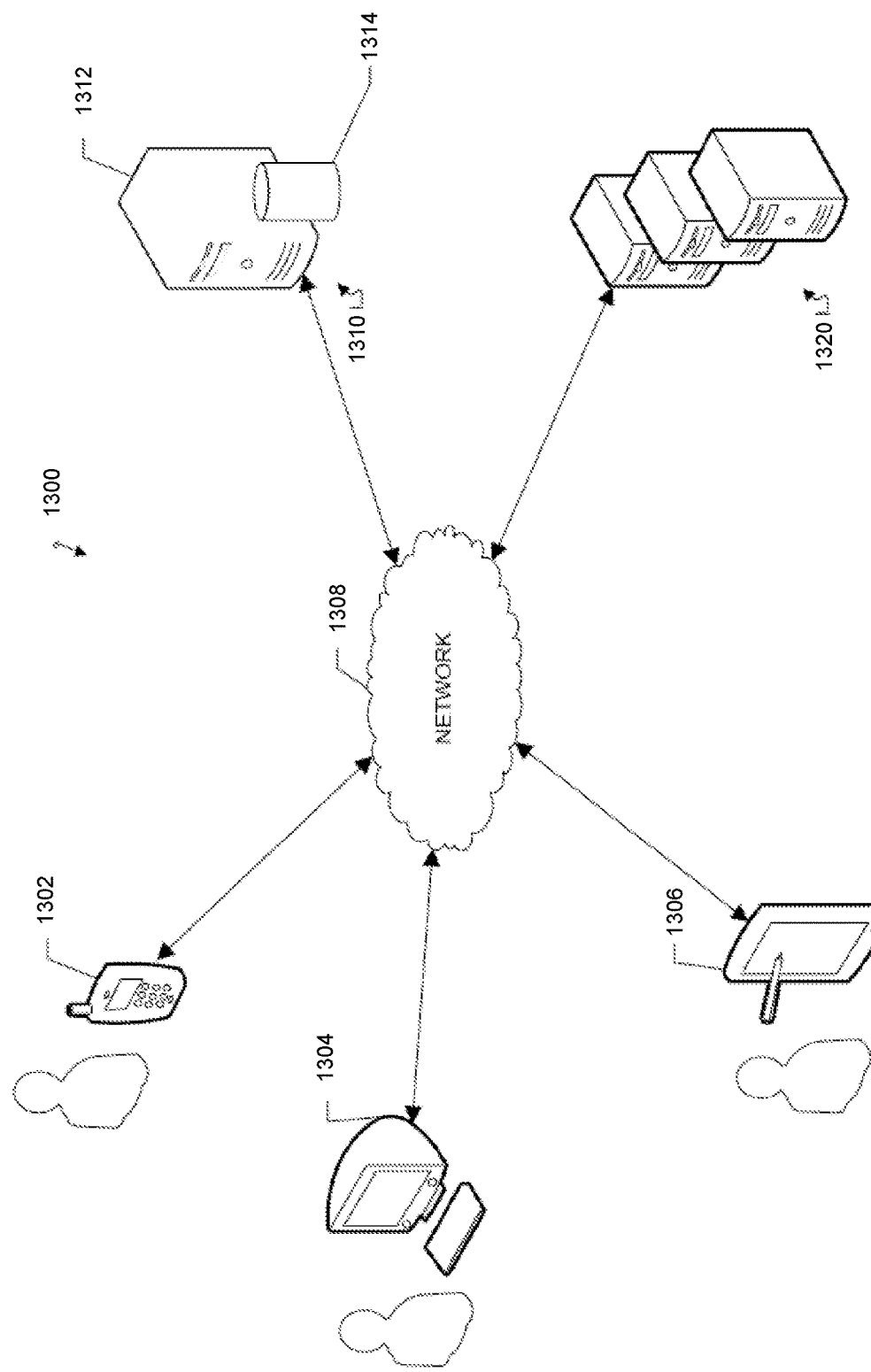
FIG. 13 illustrates an exemplary network environment for implementing the disclosed data-transmission technology, in accordance with some embodiments described herein.

FIG. 13 illustrates an exemplary network environment for implementing the disclosed data-transmission technology, in accordance with some embodiments described herein. A network environment 1300 includes a number of electronic devices 1302, 1304 and 1306 communicably connected to a server 1310 by a network 1308. One or more remote servers 1320 are further coupled to the server 1310 and/or the one or more electronic devices 1302, 1304 and 1306.

In some exemplary embodiments, electronic devices 1302, 1304 and 1306 can be computing devices such as laptop or desktop computers, smartphones, PDAs, portable media players, tablet computers, televisions or other displays with one or more processors coupled thereto or embedded therein, or other appropriate computing devices that can be used for displaying a web page or web application. In one example, the electronic devices 1302, 1304 and 1306 store a user agent such as a browser or application. In the example of FIG. 13, electronic device 1302 is depicted as a smartphone, electronic device 1304 is depicted as a desktop computer, and electronic device 1306 is depicted as a PDA.

Server 1310 includes a processing device 1312 and a data store 1314. Processing device 1312 executes computer instructions stored in data store 1314, for example, to assist in scheduling a customer-initiated service or a service-provider-initiated service between a service provider and a customer at electronic devices 1302, 1304 and 1306 during a service scheduling process.

In some exemplary aspects, server 1310 can be a single computing device such as a computer server. In other embodiments, server 1310 can represent more than one computing device working together to perform the actions of a server computer (e.g., cloud computing). The server 1310 may host the web server communicably coupled to the browser at the client device (e.g., electronic devices 1302, 1304 or 1306) via network 1308. In one example, the server 1310 may host a client application for scheduling a customer-initiated service or a service-provider-initiated service between a service provider and a customer during a service scheduling process. Server 1310 may further be in communication with one or more remote servers 1320 either through the network 1308 or through another network or communication means.

The one or more remote servers 1320 may perform various functionalities and/or storage capabilities described herein with regard to the server 1310, either alone or in combination with server 1310. Each of the one or more remote servers 1320 may host various services. For example, servers 1320 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Server 1310 may further maintain or be in communication with social networking services hosted on one or more remote servers 1320. The one or more social networking services may provide various services and may enable users to create a profile and associate themselves with other users at a remote social networking service. The server 1310 and/or the one or more remote servers 1320 may further facilitate the generation and maintenance of a social graph including the user-created associations. The social graphs may include, for example, a list of all users of the remote social networking service and their associations with other users of a remote social networking service.

Each of the one or more remote servers 1320 can be a single computing device, such as a computer server, or can represent more than one computing device working together to perform the actions of a server computer (e.g., cloud computing). In one embodiment server 1310 and one or more remote servers 1320 may be implemented as a single server or a cluster of servers. In one example, server 1310 and one or more remote servers 1320 may communicate through the user agent at the client device (e.g., electronic devices 1302, 1304 or 1306) via network 1308.

Users may interact with the system hosted by server 1310, and/or one or more services hosted by remote servers 1320, through a client application installed at the electronic devices 1302, 1304, and 1306. Alternatively, the user may interact with the system and the one or more social networking services through a web-based browser application at the electronic devices 1302, 1304, and 1306. Communication among client devices 1302, 1304, 1306 and the system, and/or one or more services, may be facilitated through a network (e.g., network 1308).

Communication among the client devices 1302, 1304, 1306, server 1310 and/or one or more remote servers 1320 may be facilitated through various communication protocols. In some aspects, client devices 1302, 1304, 1306, server 1310 and/or one or more remote servers 1320 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth®-enabled device, Wi-Fi, or another such transceiver.

Network 1308 can include, for example, any one or more of a personal area network (PAN), a local area network (LAN), a campus area network (CAN), a metropolitan area network (MAN), a wide area network (WAN), a broadband network (BBN), the Internet, and the like. Further, network 1308 can include, but is not limited to, any one or more of the following network topologies, including a bus network, a star network, a ring network, a mesh network, a star-bus network, a tree or hierarchical network, and the like.

Figure 14:
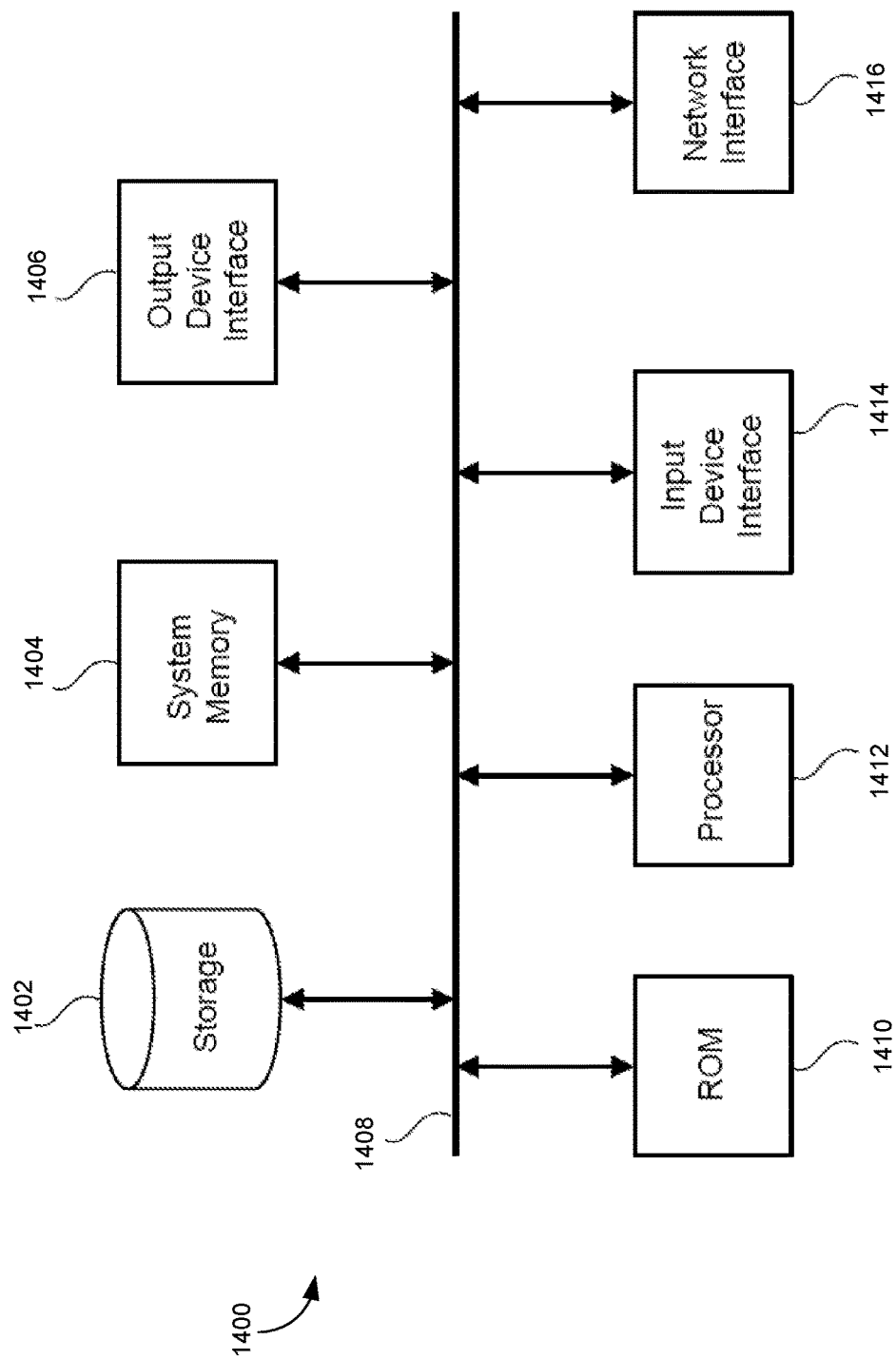
FIG. 14 conceptually illustrates an electronic system with which some implementations of the subject technology are implemented.

FIG. 14 conceptually illustrates an electronic system with which some implementations of the subject technology are implemented. Electronic system 1400 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 1400 includes a bus 1408, processing unit(s) 1412, a system memory 1404, a read-only memory (ROM) 1410, a permanent storage device 1402, an input device interface 1414, an output device interface 1406, and a network interface 1416.

Bus 1408 collectively represents all system, peripheral, and chipset buses that communicatively connect the numerous internal devices of electronic system 1400. For instance, bus 1408 communicatively connects processing unit(s) 1412 with ROM 1410, system memory 1404, and permanent storage device 1402.

From these various memory units, processing unit(s) 1412 retrieves instructions to execute and data to process in order to execute the processes of the subject disclosure. The processing unit(s) can be a single processor or a multi-core processor in different implementations.

ROM 1410 stores static data and instructions that are needed by processing unit(s) 1412 and other modules of electronic system 1400. Permanent storage device 1402, on the other hand, is a read-and-write memory device. This device is a non-volatile memory unit that stores instructions and data even when electronic system 1400 is off. Some implementations of the subject disclosure use a mass-storage device (such as a magnetic or optical disk and its corresponding disk drive) as permanent storage device 1402.

Other implementations use a removable storage device (such as a floppy disk, flash drive, and its corresponding disk drive) as permanent storage device 1402. Like permanent storage device 1402, system memory 1404 is a read-and-write memory device. However, unlike storage device 1402, system memory 1404 is a volatile read-and-write memory, such as random access memory. System memory 1404 stores some of the instructions and data that the processor needs at runtime. In some implementations, the processes of the subject disclosure are stored in system memory 1404, permanent storage device 1402, and/or ROM 1410. From these various memory units, processing unit(s) 1412 retrieves instructions to execute and data to process in order to execute the processes of some implementations.

Bus 1408 also connects to input and output device interfaces 1414 and 1406, respectively. Input device interface 1414 enables the user to communicate information and select commands to the electronic system. Input devices used with input device interface 1414 include, for example, alphanumeric keyboards and pointing devices (also called "cursor control devices"). Output device interface 1406 enables, for example, the display of images generated by electronic system 1400. Output devices used with output device interface 1406 include, for example, printers and display devices, such as cathode ray tubes (CRTs) or liquid crystal displays (LCDs). Some implementations include devices such as a touchscreen that function as both input and output devices.

Finally, as shown in FIG. 14, bus 1408 also couples electronic system 1400 to a network (not shown) through a network interface 1416. In this manner, the computer can be a part of a network of computers (such as a local area network ("LAN"), a wide area network ("WAN"), an intranet, or a network of networks, such as the Internet. Any or all components of electronic system 1400 can be used in conjunction with the subject disclosure.

These functions described above can be implemented in digital electronic circuitry; or in computer software, firmware or hardware. The techniques can be implemented using one or more computer program products. Programmable processors and computers can be included in or packaged as mobile devices. The processes and logic flows can be performed by one or more programmable processors or by one or more programmable logic circuitries. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for controlling data transmission over a cellular network, the method comprising:
   receiving, by an application server from a gateway of the cellular network, configuration information associated with a user equipment (UE) coupled to the cellular network, wherein the application server services an application running on the UE;
   determining, by the application server, whether the UE is configured to turn off cellular data based on the configuration information received from the gateway of the cellular network; and
   in response to the application server determining that the UE is configured to turn off cellular data, configuring the application server in such a way that the application server ceases to send data packets associated with the application to the UE via the gateway of the cellular network.

2. The computer-implemented method of claim 1, wherein the cellular network is a Long-Term Evolution network.

3. The computer-implemented method of claim 2, wherein the application server receives the configuration information from the gateway of the cellular network via a third-party server configured to provide a Service Capability Exposure Function.

4. The computer-implemented method of claim 1, further comprising subscribing, by the application server, to connection-status reports associated with the UE at a third-party server.

5. The computer-implemented method of claim 4, wherein a respective connection-status report comprises at least identification information and the configuration information associated with the UE.

6. The computer-implemented method of claim 5, wherein the identification information comprises:
   the UE's Internet Protocol (IP) address; or
   the UE's IP address and a phone number associated with the UE.

7. The computer-implemented method of claim 5, wherein the configuration information comprises one or more of:
   Wi-Fi setting;
   cellular data on-off setting; and
   data-roaming on-off setting.

8. The computer-implemented method of claim 1, wherein the gateway of the cellular network is configured to receive configuration information from the UE.

9. The computer-implemented method of claim 1, further comprising:
   in response to the UE is configured to turn off cellular data, sending data packets associated with the application to the UE via a Wi-Fi channel or a Short Message Service (SMS) channel.

10. A computer network, comprising:
    a cellular network coupled to a user equipment (UE); and
    an application server for servicing an application running on the UE;
    wherein the application server is configured to:
       receive, from a gateway of the cellular network, configuration information associated with UE;
       determining whether the UE is configured to turn off cellular data based on the configuration information received from the gateway of the cellular network; and
       in response to determining that the UE is configured to turn off cellular data, cease to send data packets associated with the application to the UE via the cellular network.

11. The computer network of claim 10, wherein the cellular network is a Long-Term Evolution network.

12. The computer network of claim 11, further comprising a third-party server configured to provide a Service Capability Exposure Function, and
    wherein the third-party server is configured to forward the configuration information associated with the UE to the application server.

13. The computer network of claim 10, wherein the application server is configured to subscribe to connection-status reports associated with the UE at a third-party server.

14. The computer network of claim 13, wherein a respective connection-status report comprises at least identification information and the configuration information associated with the UE.

15. The computer network of claim 14, wherein the identification information comprises:
    the UE's Internet Protocol (IP) address; or
    the UE's IP address and a phone number associated with the UE.

16. The computer network of claim 14, wherein the configuration information comprises one or more of:
    the UE's Wi-Fi setting;
    the UE's cellular data on-off setting; and
    the UE's data-roaming on-off setting.

17. The computer network of claim 10, wherein the application server is further configured to:
    in response to determining that the UE is configured to turn off cellular data, send data packets associated with the application to the UE via a Wi-Fi channel or a Short Message Service (SMS) channel.

18. A computer network, comprising:
    a cellular network; and
    a user equipment (UE) coupled to the cellular network and an application server, the application server being configured to service an application running on the UE;
    wherein the UE is configured to transmit configuration information associated with UE to the application server via a gateway of the cellular network, wherein the configuration information indicates whether the UE is configured to turn off cellular data, thereby enabling the application server to cease to send data packets associated with the application to the UE via the cellular network, in response to the application server determining that the UE is configured to turn off cellular data based on the configuration information received from the gateway.

\* \* \* \* \*